United States Patent
Toyoda et al.

(10) Patent No.: US 7,734,111 B2
(45) Date of Patent: Jun. 8, 2010

(54) IMAGE PROCESSING APPARATUS, IMAGE PROCESSING METHOD, AND COMPUTER PRODUCT

(75) Inventors: Yuushi Toyoda, Kawasaki (JP); Masayoshi Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 940 days.

(21) Appl. No.: 11/510,666

(22) Filed: Aug. 28, 2006

(65) Prior Publication Data
US 2007/0237418 A1 Oct. 11, 2007

(30) Foreign Application Priority Data
Apr. 5, 2006 (JP) ............... 2006-104118

(51) Int. Cl.
G06K 9/40 (2006.01)
H04N 9/64 (2006.01)
H04N 1/409 (2006.01)
(52) U.S. Cl. .............. 382/264; 348/571; 358/3.27
(58) Field of Classification Search .............. 382/254, 382/260–261, 264, 266, 269–275; 348/571, 348/576, 597, 687, 688; 358/3.27, 448, 530–533, 358/537
See application file for complete search history.

(56) References Cited

U.S. PATENT DOCUMENTS

| 4,794,531 | A | * | 12/1988 | Morishita et al. | 382/132 |
|---|---|---|---|---|---|
| 4,941,190 | A | * | 7/1990 | Joyce | 382/264 |
| 4,972,256 | A | * | 11/1990 | Hirosawa et al. | 358/532 |
| 5,031,227 | A | * | 7/1991 | Raasch et al. | 382/199 |
| 5,038,388 | A | * | 8/1991 | Song | 382/266 |
| 5,081,692 | A | * | 1/1992 | Kwon et al. | 382/263 |
| 5,218,649 | A | * | 6/1993 | Kundu et al. | 382/180 |
| 5,610,999 | A | * | 3/1997 | Bannai et al. | 382/272 |
| 6,094,508 | A | * | 7/2000 | Acharya et al. | 382/199 |
| 6,697,537 | B2 | * | 2/2004 | Norimatsu | 382/275 |
| 7,421,146 | B2 | * | 9/2008 | Kwon | 382/275 |
| 7,567,727 | B2 | * | 7/2009 | Kondo et al. | 382/274 |
| 2004/0071360 | A1 | * | 4/2004 | Maurer | 382/254 |
| 2005/0105819 | A1 | * | 5/2005 | Burch et al. | 382/264 |
| 2006/0045377 | A1 | | 3/2006 | Kawai | |
| 2006/0093235 | A1 | * | 5/2006 | Takarada | 382/264 |
| 2006/0245665 | A1 | * | 11/2006 | Lee et al. | 382/266 |

FOREIGN PATENT DOCUMENTS

| JP | 2000-511315 | 8/2000 |
|---|---|---|
| JP | 2006-065676 | 3/2006 |

OTHER PUBLICATIONS

Japanese Office Action issued on Feb. 16, 2010 in corresponding Japanese Patent Application No. 2006-104118.

* cited by examiner

Primary Examiner—Manav Seth
(74) Attorney, Agent, or Firm—Staas & Halsey LLP

(57) ABSTRACT

An image processing apparatus includes a surrounding-pixels selecting unit that selects surrounding pixels that surround a correction pixel in an input image based on a low-pass filter, a reference-pixels selecting unit that selects pixels from the surrounding pixels based on pixel values of the correction pixel and the surrounding pixels, a smoothed-image creating unit that applies the low-pass filter to the reference pixels to create a smoothed image of the reference pixels, and an output image creating unit that creates an output image based on the smoothed image, and a difference image between the smoothed image and the input image.

13 Claims, 9 Drawing Sheets

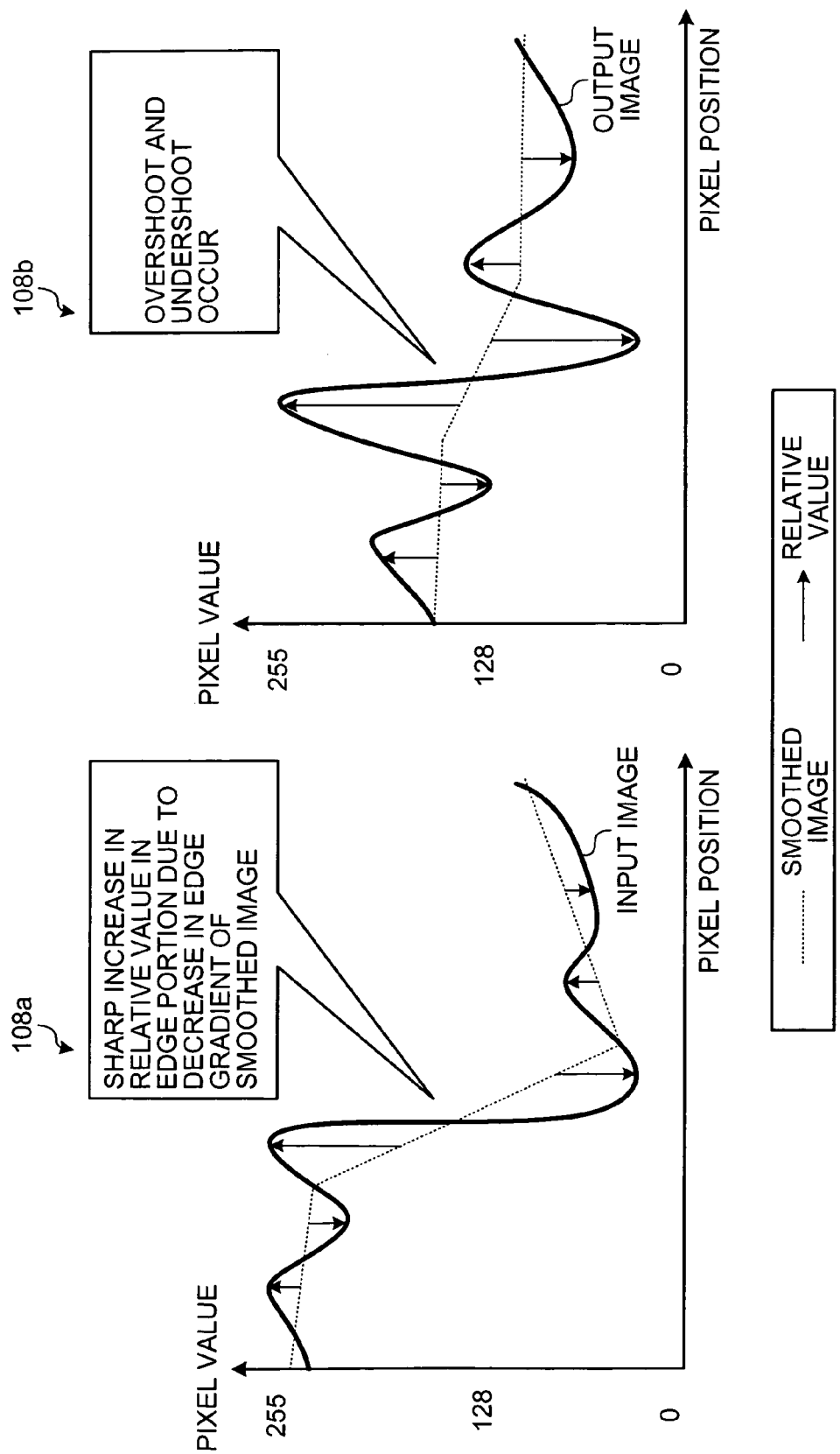

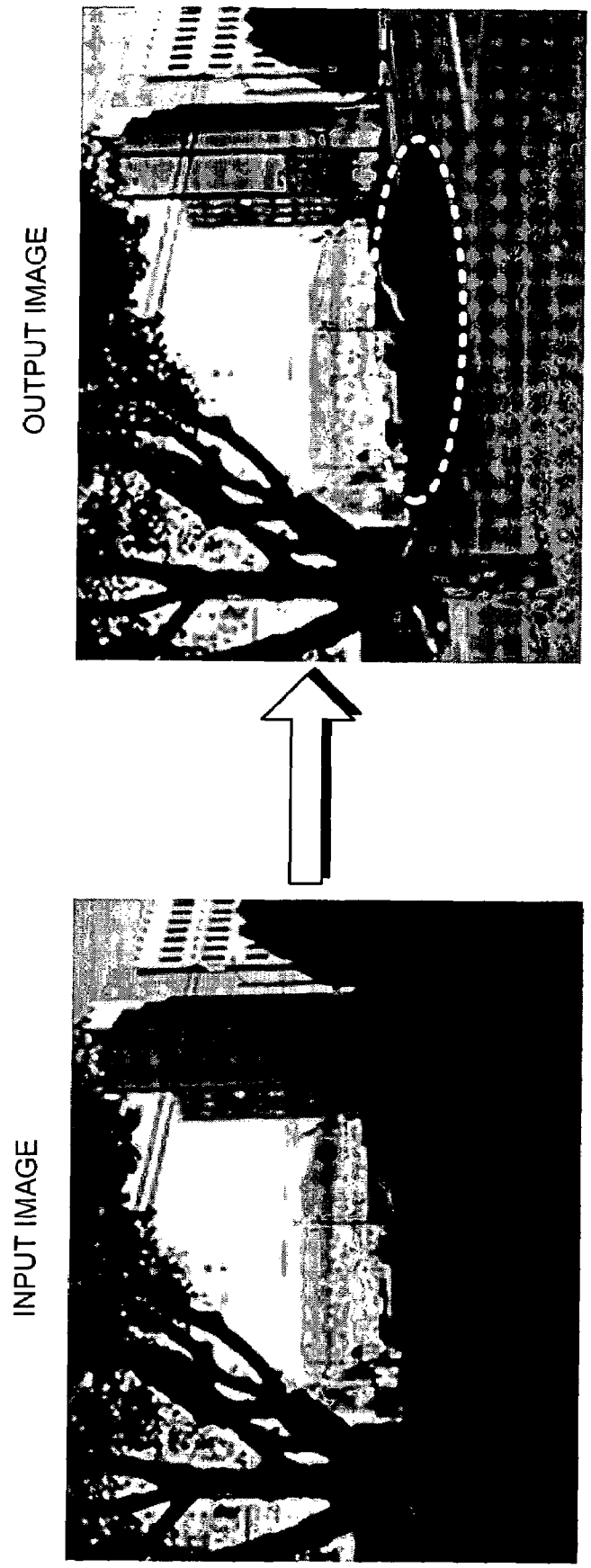

IMAGE PROCESSING APPARATUS, IMAGE PROCESSING METHOD, AND COMPUTER PRODUCT

BACKGROUND OF THE INVENTION

1. Field of the Invention

The present invention relates to a technology for compressing the dynamic range of an input image.

2. Description of the Related Art

An image enhancement method called Center/Surround Retinex (hereinafter, "Retinex method"), modeled after human vision, is generally used to compress the dynamic range of an input image.

For example, Japanese Patent Laid-Open Publication No. 200-511315 discloses a technique concerning the Retinex method, in which the dynamic range of the entire image is compressed by suppressing low-frequency components extracted from the input image with a low-pass filter.

According to the Retinex method, a pixel value $O(x, y)$ of an output image is represented as follows:

$$O(x,y)=\log(I(x,y))-\log(LPF(I(x,y)))$$

where $I(x, y)$ is a pixel value of an input image, and $LPF(I(x, y))$ is a pixel value of the low-frequency component extracted by a low-pass filter.

The Retinex method produces excellent results on dynamic range compression in low-frequency areas where brightness changes gradually. However, overshoot or undershoot occurs in high-frequency areas (such as edge areas) where there is a sharp change in the brightness, resulting in degradation in the quality of an output image.

Specifically, in the Retinex method, a smoothed pixel value (low-frequency components) is calculated by low-pass filtering pixels around a pixel that is to be corrected (hereinafter, "correction pixel"), and the smoothed pixel value is approximated to the center value of the dynamic range (suppression of low-frequency components). In addition, a relative value (high-frequency components) of the smoothed pixel value and the pixel value of the correction pixel is enhanced (enhancement of high-frequency components). The suppressed low-frequency components and the enhanced high-frequency components are then combined to produce an output image. In the edge portion where there is a sharp change in the brightness, the relative value of a smoothed image (composed of smoothed pixels) and an input image increases sharply, which compromises the quality of the output image.

Thus, there is a need of a technology capable of preventing overshoot and undershoot at edge portions while achieving dynamic range compression of low-frequency components.

SUMMARY OF THE INVENTION

It is an object of the present invention to at least partially solve the problems in the conventional technology.

According to an aspect of the present invention, an image processing apparatus includes a surrounding-pixels selecting unit that selects surrounding pixels that surround a correction pixel in an input image based on a low-pass filter, a reference-pixels selecting unit that selects pixels from the surrounding pixels based on pixel values of the correction pixel and the surrounding pixels, a smoothed-image creating unit that applies the low-pass filter to the reference pixels to create a smoothed image of the reference pixels, and an output image creating unit that creates an output image based on the smoothed image, and a difference image between the smoothed image and the input image.

According to another aspect of the present invention, an image processing method includes selecting surrounding pixels that surround a correction pixel in an input image based on a low-pass filter, selecting pixels from the surrounding pixels based on pixel values of the correction pixel and the surrounding pixels, applying the low-pass filter to the reference pixels to create a smoothed image of the reference pixels, and creating an output image based on the smoothed image, and a difference image between the smoothed image and the input image.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic for explaining a problem in the conventional image processing method; and FIG. 9 is an example of an output image created by the conventional image processing.

DETAILED DESCRIPTION OF THE PREFERRED EMBODIMENTS

Exemplary embodiments of the present invention are described below with reference to the accompanying drawings. The image processing method according to the present invention seeks to improve an image degradation phenomenon seen in the Retinex method.

Figure 1:
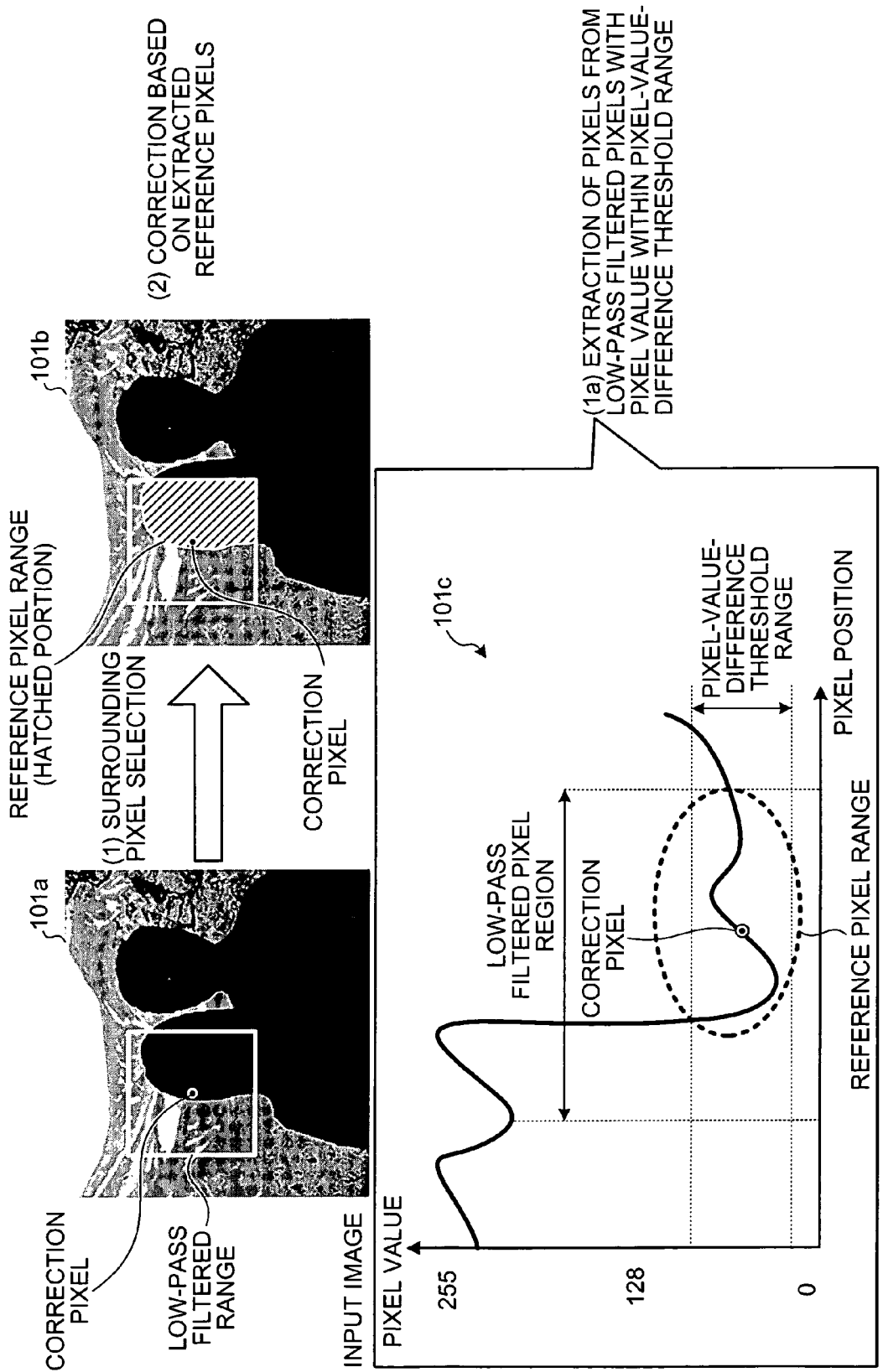
FIG. 1 is a schematic for explaining an image processing method according to an embodiment of the present invention.

FIG. 1 is a schematic for explaining an image processing method according to an embodiment of the present invention. As shown in FIG. 1, the salient feature of the image processing method is the selection process of surrounding pixels (hereinafter, "reference pixels") referred to in the creation of a smoothed image from an input image.

Figure 7:
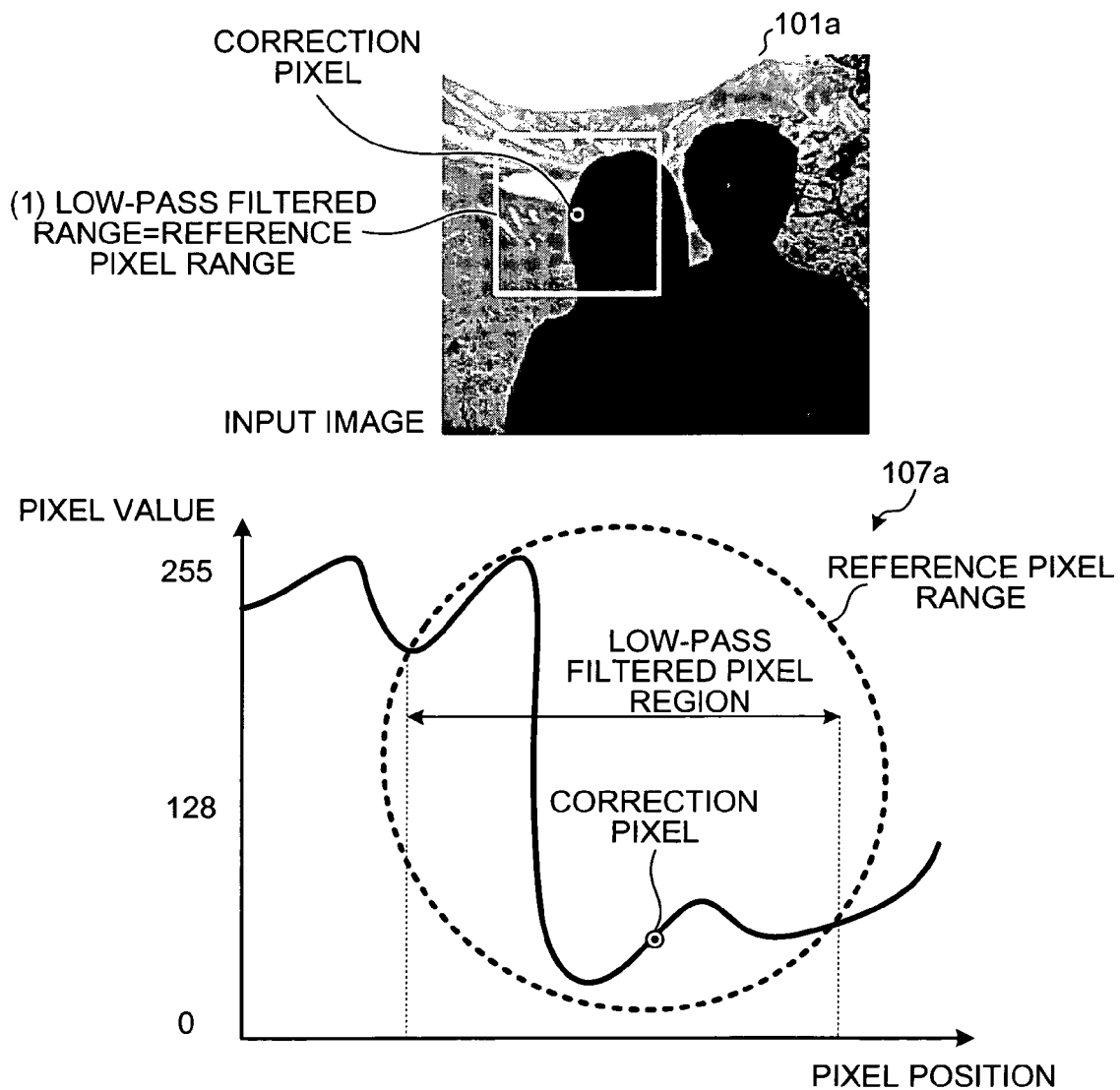
FIG. 7 is a schematic for explaining a conventional image processing method.

An overview of a conventional image processing method and a problem therein is explained next with reference to FIGS. 7 and 8 to explain the salient feature of the present invention. FIG. 7 is a schematic for explaining the conventional image processing method, and FIG. 8 is a schematic for explaining the problem in the conventional image processing method.

As shown in FIG. 7, in the conventional image processing method (Retinex method), surrounding pixels in a low-pass filtered region are used as reference pixels to correct the pixel value of a correction pixel (pixel to be corrected) in the input image. In other words, in the conventional image processing method, the low-pass filtered range and the range from which the reference pixels are selected are the same.

However, with the conventional image processing method, a correction pixel near the edge is subject to overcorrection. For example, as shown in 101a and 107a of FIG. 7, if a correction pixel is in the dark foreground (such as a backlit human figure) near the edge, the reference pixels includes (see "reference pixel range" in 107a) pixels in the bright background area (see the curve near a gray level of 255 in 107a).

The conventional image processing method therefore results in overshoot or undershoot at the edge portion of an output image obtained by correcting an input image. This problem is explained with reference to FIG. 8. In FIG. 8 (see 108a and 108b), the vertical axis represents the gray level (from 0 to 255), and horizontal axis represents the pixel position.

In FIG. 8, 108a indicates a smoothed image (represented by the dashed line) obtained by applying a low-pass filter to surrounding pixels around a correction pixel in an input image (represented by the solid line), and the relative value of the input image and the smoothed image (represented by the arrows). In FIG. 8, 108b indicates a smoothed image (represented by the dashed line) that has been processed to be approximated to the center of the dynamic range, the relative value obtained after enlargement process (represented by the arrows), and an output image (represented by the straight line).

As shown in 108a of FIG. 8, the edge gradient of the smoothed image is reduced (slopes gently) in the vicinity of the edge portion, resulting in a sharp increase in the relative value. Further, as shown in 108b of FIG. 8, overshoot or undershoot occurs near the edge portion.

To solve the problem in the conventional technology, in the image processing method according to the embodiment, pixels with a pixel value significantly different from that of a correction pixel are not selected as reference pixels even if the pixels are in a low-pass filtered pixel region (see 101b of FIG. 1). In other words, pixels in a low-pass filtered pixel region for a correction pixel are selected as reference pixels when the difference in pixel value between the pixels and the correction pixel is within a predetermined range (see 101c of FIG. 1).

Thus, in the image processing method according to the embodiment, in the process of selecting surrounding pixels to be referred to when a correction pixel in an input image is corrected (see (1) of FIG. 1), pixels are selected as the reference pixels from low-pass filtered pixels when the difference in pixel value between the pixels and the correction pixel is within a predetermined range, i.e., when the pixels have a pixel value within a pixel-value-difference threshold range (see (1a) of FIG. 1). The correction process is then carried out using the reference pixel (see (2) of FIG. 1). Thus, overshoot or undershoot at the edge portion can be prevented while dynamic range compression of the low-frequency components is achieved.

Figure 2:
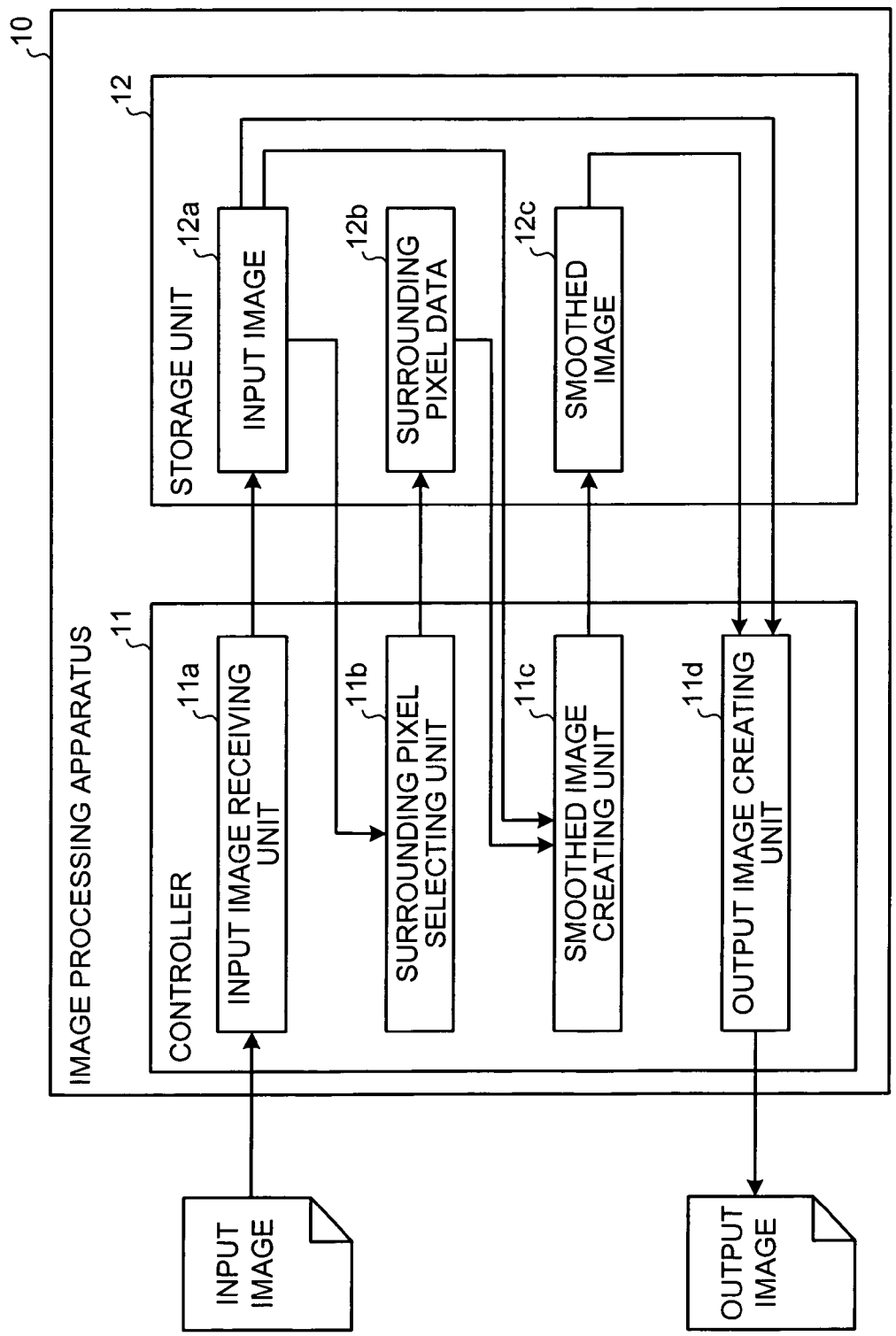
FIG. 2 is a block diagram of an image processing apparatus according to the embodiment.

An image processing apparatus to which is applied the image processing method according to the embodiment is described with reference to FIG. 2. FIG. 2 is a block diagram of an image processing apparatus 10. The image processing apparatus 10 can be built on an Integrated Circuit (IC), or can be constructed by installing a dedicated program on a personal computer or a workstation.

The image processing apparatus 10 includes a controller 11 and a storage unit 12. The controller 11 includes an input image receiving unit 11a, a surrounding pixel selecting unit 11b, a smoothed image creating unit 11c, and an output image creating unit 11d. The storage unit 12 stores therein an input image 12a, surrounding pixel data 12b, and a smoothed image 12c.

The controller 11 receives an input image as input data, creates a smoothed image by selecting surrounding pixels to low-pass filter each correction pixel based on the pixel value difference between the surrounding pixels and the correction pixel, and creates an output image based on the input image and the smoothed image.

The input image receiving unit 11a receives the input image, and stores the input image in the storage unit 12 as the input image 12a. The input image 12a stored in the storage unit 12 are used by the surrounding pixel selecting unit 11b, the smoothed image creating unit 11c, and the output image creating unit 11d.

The surrounding pixel selecting unit 11b selects reference pixels from surrounding pixels around each correction pixel in the input image 12a in the storage unit 12. Specifically, the surrounding pixel selecting unit 11b selects the surrounding pixels to obtain a smoothed pixel based on the size of a low-pass filter and the pixel value difference between the surrounding pixels and the correction pixel.

In other words, even if a surrounding pixel is in an area of the filter size, the surrounding pixel selecting unit 11b does not include the surrounding pixel in pixels subjected to smoothed pixel calculation and treats it as belonging to a non-reference area if the pixel value of the surrounding pixel differs more than a predetermined threshold value from that of the correction pixel. On the other hand, if the difference between the surrounding pixel and the correction pixel is less than or equal to the predetermined threshold value, the surrounding pixel selecting unit 11b selects the surrounding pixel for the smoothed pixel calculation. It is preferable to use a threshold value of the pixel value difference that is dynamically variable.

The surrounding pixel selecting unit 11b also stores data on the surrounding pixels for each correction pixel in the storage unit 12 as the surrounding pixel data 12b. The surrounding pixel data 12b stored in the storage unit 12 is used by the smoothed image creating unit 11c.

The smoothed image creating unit 11c creates the smoothed image 12c by applying a low-pass filter to the input image 12a based on the surrounding pixel data 12b obtained by the surrounding pixel selecting unit 11b. The size of the low-pass filter used by the smoothed image creating unit 11c is preferably about one-third of the short side of the input image 12a. However, the low-pass filter can be of any size. The low-pass filter is preferably configured such that the center pixel is weighed.

Thus, the surrounding pixel selecting unit 11b selects surrounding pixels (reference pixels) used for creating a smoothed image based on the difference in pixel value between a correction pixel and the surrounding pixels. The smoothed image creating unit 11c creates the smoothed image 12c based on the reference pixels selected by the surrounding pixel selecting unit 11b. As a result, the edge gradient of the smoothed image is maintained (see 105a of FIG. 5).

The output image creating unit 11d creates an output image based on the smoothed image 12c created by the smoothed image creating unit 11c and the input image 12a received by the input image receiving unit 11a. The output image creating unit 11d first calculates correction magnitude to correct the pixel value of the input image 12a based on the input image 12a and the smoothed image 12c, and then creates the output image based on the calculated correction magnitude.

Specifically, the output image creating unit 11d calculates low-frequency components and high-frequency components of the input image 12a based on the input image 12a and the smoothed image 12c. The low-frequency components herein refer to the smoothed image 12c itself and the high-frequency components refer to the difference between the input image 12a and the smoothed image 12c.

After calculating the low-frequency components and the high-frequency components, the output image creating unit 11d carries out a process to approximate the pixel value of the low-frequency components (the smoothed image 12c) to the center value (128) to compress the dynamic range of the low-frequency components. The pixel value of the smoothed image 12c is approximated at an empirical rate to the center value 128, and is generally set to about the midpoint of the pixel value of the smoothed image 12c and the center value 128.

The output image creating unit 11d creates the output image by adding the high-frequency components (the difference between the input image 12a and the smoothed image 12c) to the smoothed image 12c after the pixel value of the smoothed image 12c is approximated to the center value.

The enhanced high-frequency components can also be added to the smoothed image 12c. In this case, by emphasizing the high-frequency components, a sharp output image can be created. Alternatively, the high-frequency components can be nonlinearly enhanced, and then added to the smoothed image 12c. Because of less change in the high-frequency components, a natural output image can be obtained.

The storage unit 12 includes a storage device such as a non-volatile Random Access Memory (RAM), and stores therein the input image 12a, the surrounding pixel data 12b, and the smoothed image 12c. The input image 12a is the same image that is received by the input image receiving unit 11a.

The surrounding pixel data 12b is data stored in the storage unit 12 by the surrounding pixel selecting unit 11b. The surrounding pixel data 12b indicates reference pixels for each correction pixel in the input image 12a. Specifically, as the surrounding pixel data 12b, the position of each correction pixel and a reference pixel range for the correction pixel are stored in an associated manner. The smoothed image 12c is created by the smoothed image creating unit 11c by smoothing the input image 12a based on the surrounding pixel data 12b.

Figure 3:
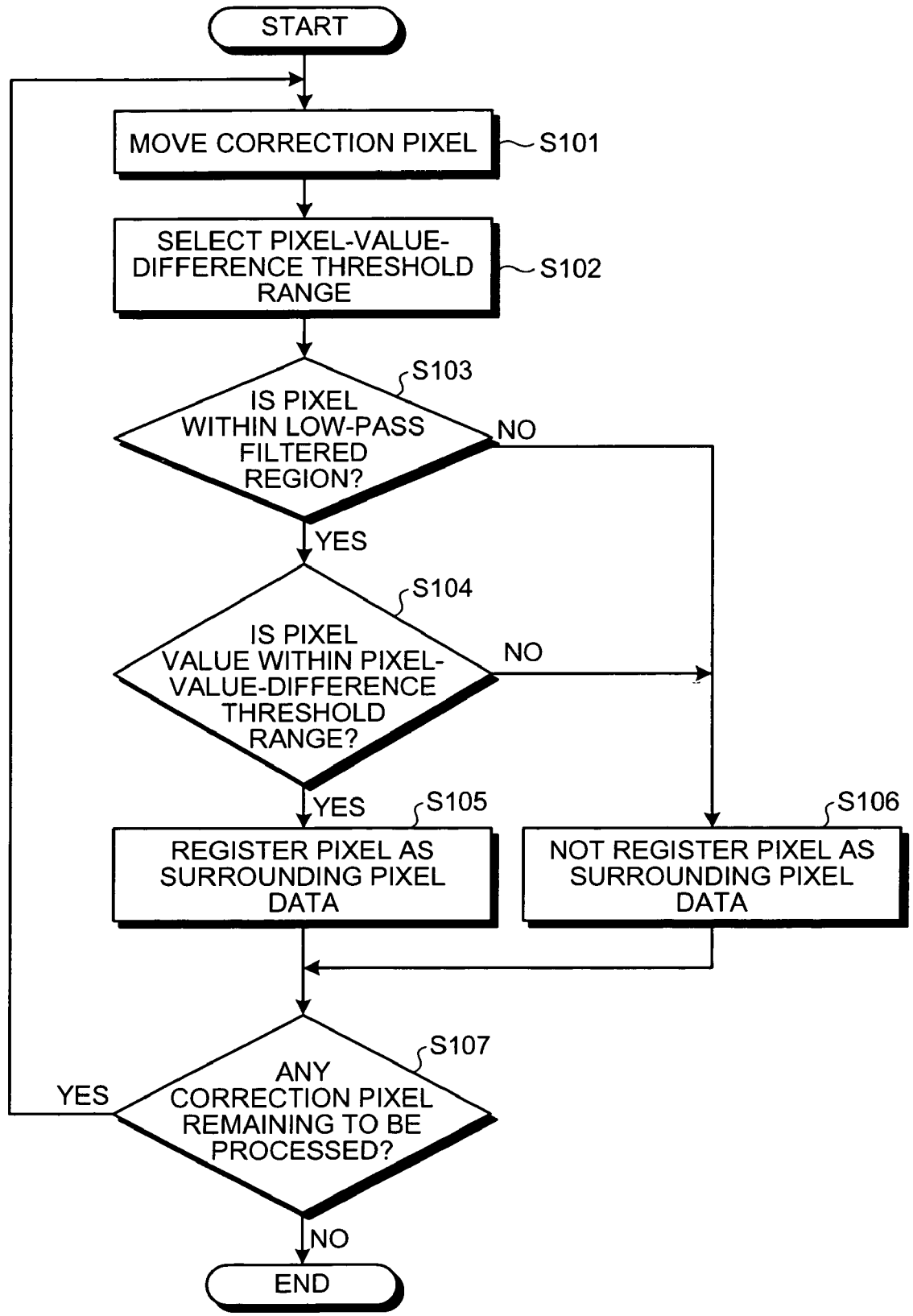
FIG. 3 is a flowchart of an operation performed by a surrounding pixel selecting unit shown in FIG. 2.

The surrounding pixel selection process performed by the surrounding pixel selecting unit 11b of the image processing apparatus 10 is explained next with reference to FIG. 3. The surrounding pixel selecting unit 11b first moves a correction pixel in the input image 12a (step S101), and then selects a pixel-value-difference threshold range corresponding to each pixel value (step S102).

The surrounding pixel selecting unit 11b then checks whether each surrounding pixel is in the low-pass filtered region (step S103). If the surrounding pixel is in the low-pass filtered region (Yes at step S103), the surrounding pixel selecting unit 11b checks whether the pixel value of the surrounding pixel is within the pixel-value-difference threshold range selected at step S102 (step S104). If the pixel value of the surrounding pixel is within the pixel-value-difference threshold range (Yes at step S104), the surrounding pixel selecting unit 11b registers the surrounding pixel as a reference pixel in the surrounding pixel data 12b (step S105).

If the surrounding pixel is not in the low-pass filtered region (No at step S103) or if the pixel value of the surrounding pixel is not within the pixel-value-difference threshold range (No at step S104), the surrounding pixel selecting unit 11b does not register the surrounding pixel as the reference pixel (step S106).

The surrounding pixel selecting unit 11b then checks whether any correction pixel remains to be processed (step S107). If any (Yes at step S107), the surrounding pixel selecting unit 11b repeats the steps from step S101 onwards until all the correction pixels are processed. If it is determined that there is no unprocessed correction pixel (No at step S107), the surrounding pixel selecting unit 11b terminates the process.

Figure 4:
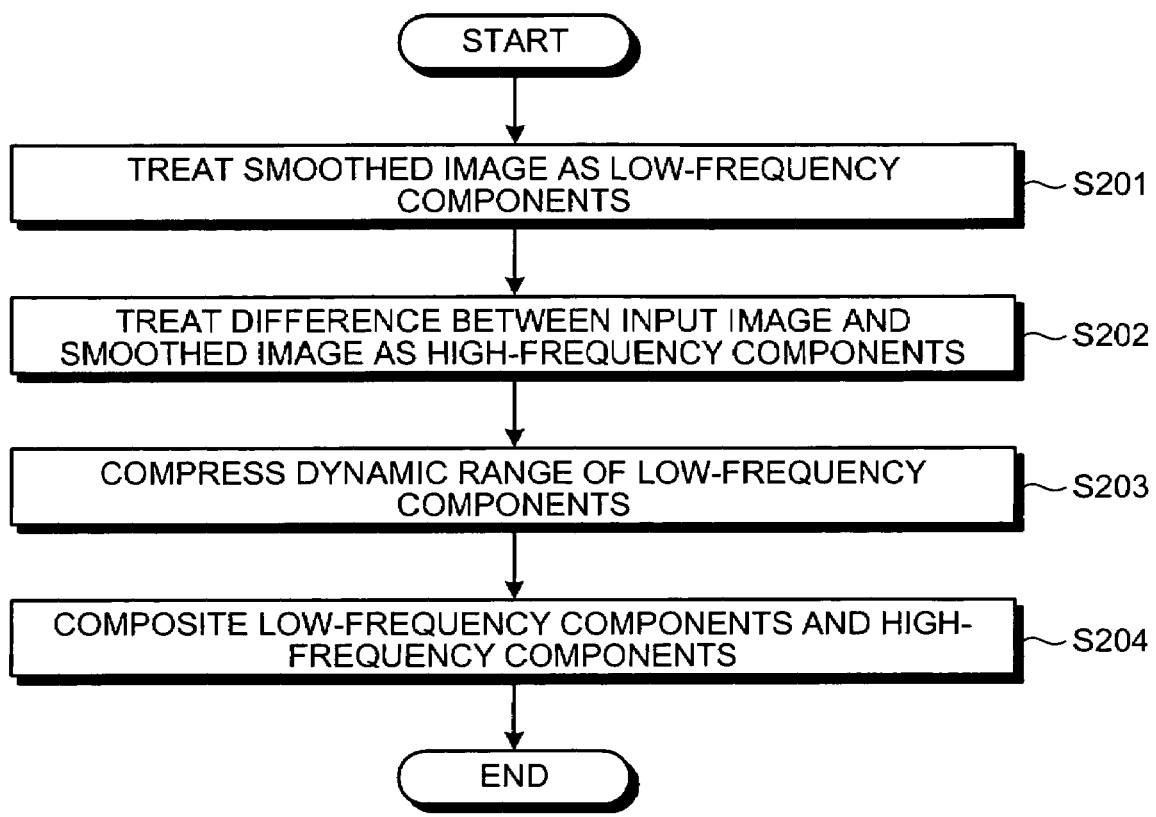
FIG. 4 is a flowchart of an operation performed by an output image creating unit shown in FIG. 2.

The output image creation process performed by the output image creating unit 11d of the image processing apparatus 10 is explained next with reference to FIG. 4. The output image creating unit 11d treats the smoothed image 12c as low-frequency components (step S201), and treats the difference between the input image 12a and the smoothed image 12c as high-frequency components (step S202).

Next, the output image creating unit 11d compresses the dynamic range of the low-frequency components (step S203), and composites the compressed low-frequency components and the high-frequency components (step S204) to create the output image, thereby terminating the process.

Figure 5:
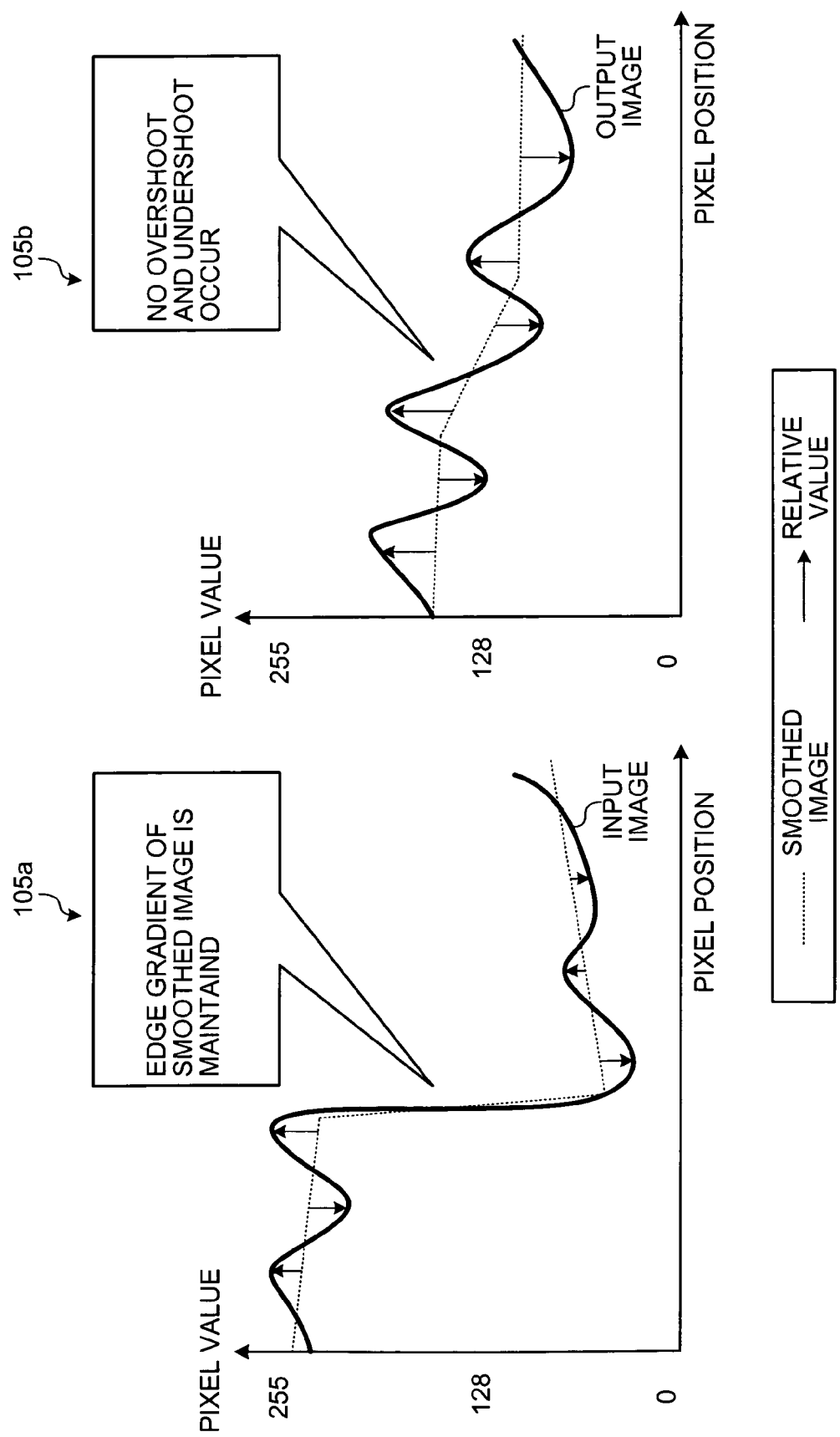
FIG. 5 is a schematic for explaining a result of image processing according to the embodiment.

FIG. 5 is a schematic for explaining the image processing result according to the embodiment. In FIG. 5, 105a and 105b correspond respectively to 108a and 108b of FIG. 8.

As shown in 105a of FIG. 5, because the edge gradient of the smoothed image 12c is maintained, no overshoot and undershoot is observed in the vicinity of the edge portion in the output image as shown in 105b of FIG. 5. Thus, overshoot and undershoot can be prevented at the edge portion while dynamic range compression of the low-frequency components is achieved.

Figure 6:
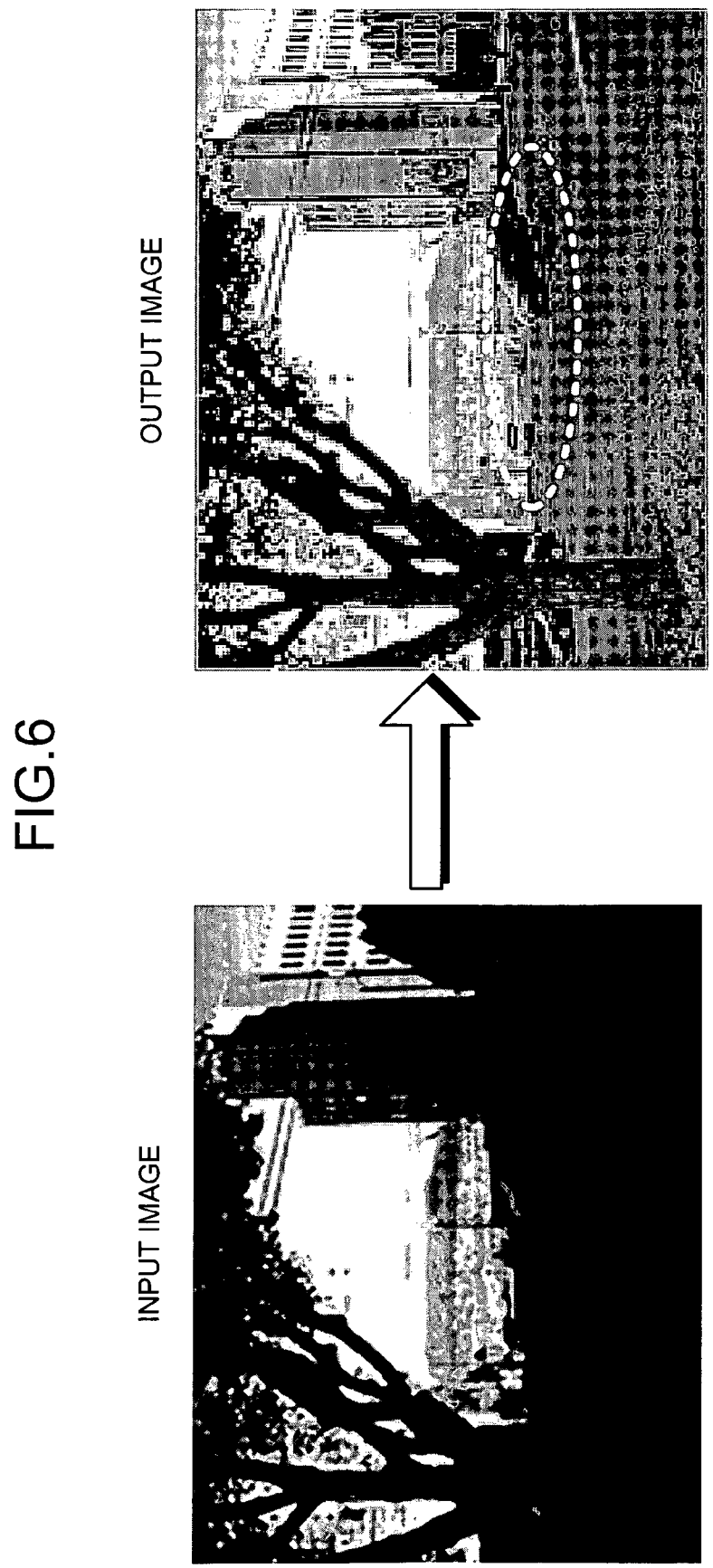
FIG. 6 is an example of an output image created by the image processing according to the embodiment.

FIG. 6 is an example of an output image created by the image processing according to the embodiment. FIG. 9 is an example of an output image created by the conventional image processing. While in the output image shown in FIG. 9, a car parked in a dark foreground is indistinct due to a bright background, in the output image shown in FIG. 6, the car is rendered distinctly visible by the image processing according to the embodiment.

As described above, according to the present embodiment, the surrounding pixel selecting unit selects surrounding pixels to obtain a smoothed pixel based on the size of the low-pass filter and the pixel value difference between the surrounding pixels and a correction pixel, and thereby creates surrounding pixel data. The smoothed image creating unit low-pass filters an input image based on the surrounding pixel data, and creates a smoothed image. Further, the output image creating unit adds the difference between the input image and the smoothed image, which constitutes the high-frequency components of the input image, to the smoothed image, which constitutes the low-frequency components of the input image, and creates an output image.

Thus, image degradation due to overshoot and undershoot at the edge portion observed in the Retinex method can be prevented while dynamic range compression of the low-frequency components is achieved.

The image processing apparatus 10 is explained above as hardware; however, it can be implemented as software. In other words, a computer program can be executed on a personal computer or a workstation to realize the same function as the image processing apparatus 10. Such a program can be downloaded via a network such as the Internet.

The program can be stored in a computer-readable recording medium such as a hard disk, a Flexible Disk (FD), Compact Disk-Read Only Memory (CD-ROM), Magneto Optic (MO) disk, Digital Versatile Disk (DVD), and can be read therefrom and executed by the computer.

As set forth hereinabove, according to an embodiment of the present invention, surrounding pixels are selected based on a pixel value difference between the surrounding pixels and a correction pixel. A smoothed image constituted by smoothed pixels is created based on the selected surrounding pixels. An output image is created based on the smoothed image, and a difference between the smoothed image and an input image.

Moreover, a surrounding pixel is selected if the difference in pixel value between the surrounding pixel and the correction pixel is less than or equal to a predetermined threshold value. That is, surrounding pixels with a pixel value significantly different from that of the correction pixel are not selected to create the smoothed image. As a result, overshoot and undershoot at the edge portion can be suppressed while dynamic range compression of low-frequency components is achieved. Consequently, image degradation due to overshoot and undershoot at the edge portion in the Retinex method is less noticeable.

Furthermore, the threshold value is changed so that an appropriate threshold value can be selected according to the pixel value of the correction pixel. Thereby, surrounding pixels can be appropriately selected to create the smoothed image. Moreover, the output image is created based on the smoothed image obtained by reducing the amplitude of each pixel. Thus, a dynamic range of low-frequency components of the input image can be appropriately compressed.

Furthermore, the output image is created based on the difference between the input image and the smoothed image obtained by enhancing the amplitude of each pixel or nonlinearly transforming each pixel value. By emphasizing high-frequency components, a sharp output image can be created. By less change in the high-frequency components, a natural output image can be created.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a surrounding-pixels selecting unit that selects surrounding pixels that surround a correction pixel in an input image based on a low-pass filter;
   a reference-pixels selecting unit that selects reference pixels from the surrounding pixels based on pixel values of the correction pixel and the surrounding pixels;
   a smoothed-image creating unit that applies the low-pass filter to the reference pixels to create a smoothed image of the reference pixels; and
   an output image creating unit that creates an output image based on the smoothed image, and a difference image between the smoothed image and the input image.

2. The image processing apparatus according to claim 1, wherein the reference-pixels selecting unit compares a difference between the pixel values of the correction pixel and the surrounding pixels with a threshold, and selects pixels for which the difference is less than or equal to the threshold.

3. The image processing apparatus according to claim 2, wherein the reference-pixels selecting unit sets the threshold based on the pixel value of the correction pixel.

4. The image processing apparatus according to claim 1, wherein the output image creating unit creates the output image based on the smoothed image, in which amplitude of each pixel is reduced.

5. The image processing apparatus according to claim 1, wherein the output image creating unit creates the output image based on the difference image, in which amplitude of each pixel is increased.

6. The image processing apparatus according to claim 1, wherein the output image creating unit creates the output image based on the difference image, in which each pixel value is nonlinearly transformed.

7. A computer-readable recording medium that stores therein a computer program causing a computer to execute:
   selecting surrounding pixels that surround a correction pixel in an input image based on a low-pass filter;
   selecting reference pixels from the surrounding pixels based on pixel values of the correction pixel and the surrounding pixels;
   applying the low-pass filter to the reference pixels to create a smoothed image of the reference pixels; and
   creating an output image based on the smoothed image, and a difference image between the smoothed image and the input image.

8. The computer-readable recording medium according to claim 7, wherein the selecting includes comparing a difference between the pixel values of the correction pixel and the surrounding pixels with a threshold, and selecting pixels when the difference is less than or equal to the threshold.

9. The computer-readable recording medium according to claim 8, wherein the selecting includes setting the threshold based on the pixel value of the correction pixel.

10. The computer-readable recording medium according to claim 7, wherein the creating includes creating the output image based on the smoothed image, in which amplitude of each pixel is reduced.

11. The computer-readable recording medium according to claim 7, wherein the creating includes creating the output image based on the difference image, in which amplitude of each pixel is increased.

12. The computer-readable recording medium according to claim 7, wherein the creating includes creating the output image based on the difference image, in which each pixel value is nonlinearly transformed.

13. An image processing method comprising:
   selecting surrounding pixels that surround a correction pixel in an input image based on a low-pass filter;
   selecting reference pixels from the surrounding pixels based on pixel values of the correction pixel and the surrounding pixels;
   applying the low-pass filter to the reference pixels to create a smoothed image of the reference pixels; and
   creating an output image based on the smoothed image, and a difference image between the smoothed image and the input image.

* * * * *